(12) United States Patent
Zhang et al.

(10) Patent No.: US 9,306,446 B2
(45) Date of Patent: Apr. 5, 2016

(54) FAULT PROTECTION AND CORRECTION OF LINE AND LOAD FAULTS

(71) Applicants: Hong Zhang, Mountain View, CA (US); Sean Chen, Sunnyvale, CA (US); Dilip Sangam, Saratoga, CA (US); Wenbo Liang, San Jose, CA (US)

(72) Inventors: Hong Zhang, Mountain View, CA (US); Sean Chen, Sunnyvale, CA (US); Dilip Sangam, Saratoga, CA (US); Wenbo Liang, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 538 days.

(21) Appl. No.: 13/708,741

(22) Filed: Dec. 7, 2012

(65) Prior Publication Data

US 2014/0160802 A1   Jun. 12, 2014

(51) Int. Cl.
*H02M 1/32* (2007.01)
*H02M 3/335* (2006.01)
*H02H 3/24* (2006.01)
*H02H 7/12* (2006.01)
*H02M 1/36* (2007.01)

(52) U.S. Cl.
CPC ............... *H02M 1/32* (2013.01); *H02M 3/335* (2013.01); *H02H 3/243* (2013.01); *H02H 7/1213* (2013.01); *H02M 1/36* (2013.01)

(58) Field of Classification Search
CPC ........ H02M 1/32; H02M 1/36; H02H 7/1213; H02H 3/243
See application file for complete search history.

(56) References Cited

U.S. PATENT DOCUMENTS

| | | | |
|---|---|---|---|
| 2003/0062879 A1* | 4/2003 | Balakrishnan et al. | 323/277 |
| 2004/0012346 A1* | 1/2004 | Green et al. | 315/291 |
| 2005/0078492 A1* | 4/2005 | Takahashi | 363/21.15 |
| 2009/0174978 A1* | 7/2009 | Nakamura | 361/90 |

* cited by examiner

*Primary Examiner* — Harry Behm
(74) *Attorney, Agent, or Firm* — Fish & Richardson P.C.

(57) ABSTRACT

A fault protection and correction circuit for the control of a power converter is disclosed. An example circuit generates a waveform that drives a switch on or off and controls the power converter. The controller circuit in addition to power factor correction (PFC) circuitry includes a first and a second shut down mode modules, both of them cause the switching to stop. The circuit includes a module for receiving fault events. When a fault occurs, the controller enters the second shut down mode. The controller stays in the second shut down mode if the required current for this mode can be provided by the outside circuitry. Otherwise, the controller enters the first shut down mode that requires less current and subsequently restarts the controller. By modifying the outside circuitry the controller can respond differently to fault events.

21 Claims, 6 Drawing Sheets

FAULT PROTECTION AND CORRECTION OF LINE AND LOAD FAULTS

TECHNICAL FIELD

This disclosure relates generally to electronics and more specifically to fault protection and correction of power converters with Power Factor Correction (PFC) circuits for driving light emitting devices, such as Light Emitting Diode (LED).

BACKGROUND

An AC/DC power converter is used to drive a string of LEDs. The AC/DC power converter includes a rectifier circuit for rectifying an AC input voltage into a DC voltage. The isolated AC/DC power converters additionally include a transformer to isolate the output (secondary side) from the input (primary side) of the converter and therefore separate grounds are used for the input and the output of the power converter circuit. The AC/DC power converters include PFC circuitry included in the controller that controls the flow of the input current so that the input current waveform is in phase with the waveform of the AC input voltage (e.g., a sine wave). For a good power factor, the input current waveform will follow the shape and phase of the input voltage.

When a fault is detected in a power converter, many controllers of power converters implement latched fault protection by stopping the controller and waiting for a manual startup of the controller and the power converter. A number of other controllers in response to a fault implement auto retry protection and automatically restart the controller and the power converter. Some power converters implement a selectable fault protection mode by adding an extra input pin. Based on the voltage applied to the extra pin, in response to a fault the controller of the power converter either selects latched fault protection or auto retry protection.

SUMMARY

A fault protection controller circuit of a power converter is disclosed. An example fault protection controller circuit couples to a PFC circuitry to provide a waveform for turning a switch on or off in the power converter. The fault protection controller circuit includes an input node, for receiving an input voltage and an input current as well as an output node for delivering an output waveform. The fault protection controller circuit also includes two modules for activating two shut down modes of the controller, the first shut down mode and the second shut down mode. The shut down modes are configured to shut down the controller circuit and disable the output waveform to drive a small current from the input node of the circuit. The circuit also includes a fault detection module coupled to the second shut down mode module and configured to detect fault events where detecting a fault event activates the second shut down mode. The circuit further includes an initial switching (wake up) module for generating a first output waveform, a normal switching module for generating a second output waveform, and an under voltage lock out (UVLO) module coupled to the input node of the fault detection and controller circuit. The UVLO is further coupled to the first shut down mode module and defines the input voltage requirements for activating the first shut down mode or enabling one of the initial switching mode or the normal switching mode modules. Finally the output of the enabled switching module is amplified and delivered at the output node.

In another aspect, an example isolated AC/DC power converter uses the fault protection controller circuit. The power converter includes a primary side and a secondary side inductively coupled through a transformer and has different grounds for the primary and the secondary sides. The power converter also includes a primary fault controller with the PFC circuitry. A rectifying circuit receives an alternating input voltage and produces a rectified voltage coupled to the primary winding of the transformer where the primary winding is coupled through a switch to the primary side ground. The secondary winding of the transformer is coupled to an output load. The fault controller receives an input current and an input voltage from the rest of the circuit at its input node and provides an output waveform at its output node for controlling the switch coupled to the fault controller's output node and controlling the flow of current in the primary winding of the transformer.

Based on the input voltage and current of the fault controller different modes of operation are activated. When the input voltage is below a first threshold V1, the fault controller activates the first shut down mode and disables the output waveform and drives a first shut down current (I1). In the next phase, when the input voltage reaches a second threshold V2 greater than V1, the controller transitions to the initial switching mode (wake up) and provides a first output waveform for switching and driving an initial switching current (I3). In a next phase, when the power converter can supply a current I4 higher than I3, the fault controller transitions to the normal switching mode which provides the normal operation of the power converter and generates a second output waveform for switching. During normal switching and initial switching (wake up) modes, if the controller receives a fault event, the fault protection controller activates the second shut down mode and disables the output waveform and drives a second shut down current (I2) where I2 is greater than I1.

An example method is the delivering of a waveform by a fault controller to turn a switch on and off. The fault controller receives an input current and an input voltage from the rest of the circuit. The fault controller activates the first shut down mode and stops switching when the input voltage is below a first threshold V1. In this mode, the output waveform is disabled and the lowest input current I1 is required by the fault controller which is a value less than the input current that can be supplied to the fault controller. As the result, the input voltage increases to a higher second threshold V2 where at this point the fault controller transitions to the initial switching (wake up) mode, which delivers a first output waveform to the switch and requires an input current I3, which is greater than I1. During the initial switching (wake up) mode, the switching starts and then continues until the controller transitions to the normal switching mode where a second output waveform is delivered to the switch and an even higher input current I4 is drawn by the fault controller. If a fault event occurs in normal switching or initial switching modes, the fault controller activates the second shut down mode that disables the output waveform and requires an input current I2. The current I2 is more than I1. Depending on the rest of the circuit that supplies the input current, if the required current I2 is sustainable the controller stays in the second shut down mode. But if it is not sustainable the input voltage drops below V1 and the fault controller activates the first shut down mode where a restarting automatically happens.

Another example method is fault protection and controller of a power converter. The power converter is controlled by a fault controller that generates a waveform for driving a switch where turning on or off the switch controls the amount of energy in the output of the power converter. The fault controller starts up and the power converter starts working when the fault controller activates in sequence the first shut down mode followed by the initial switching mode and then the normal switching mode. The power converter is configured to include separate paths for supplying the input current and the input voltage of the fault controller. The first path is constantly supplying and is not affected by the switching action. The second path is governed by the switch and stops supplying when the switching is disabled (stops).

When a fault occurs, the fault controller activates the second shut down mode, disabling the output waveform and stop switching. The input voltage and current is supplied through the first path of the power converter. If the current supplied through the first path is enough to deliver the required current of the second shut down mode the fault controller stays in this mode and the switching stops. If the current supplied through the first path is not sufficient to sustain the second shut down mode the fault controller activates the first shut down mode that requires smaller current compared to the second shut down mode. Activating the first shut down mode causes an automatic restart of the controller.

Particular implementations of a PFC controller circuit that combines two different modes of fault protection and correction into one circuit is disclosed. A mode of fault protection and correction may be selected without a need for an extra selection node for the circuit. The selection is done by a configuration of the circuit outside the controller. Therefore, one controller can be configured for providing latched fault protection or auto retry protection. The circuit may be implemented in an integrated circuit chip for controlling the lighting of a LED diode string, detecting the fault and selecting either of the latched fault protection or the auto retry fault protection without an extra pin for the chip.

DETAILED DESCRIPTION

Figure 1:
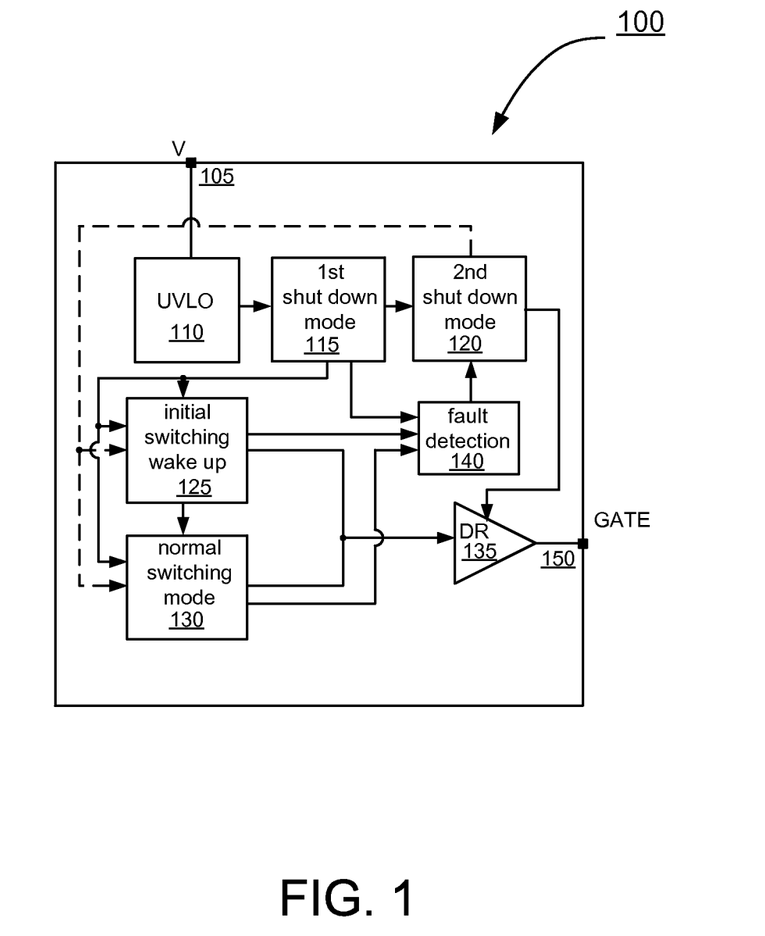
FIG. 1 is a circuit diagram of an example fault controller circuit coupled to a PFC circuit to create a fault controller.

FIG. 1 is an example circuit 100 designed to protect from fault events and produce waveforms for controlling the power converter. The isolated power converter utilizes a transformer (not shown) between the input and the output of the power converter. The circuit 100 as the primary controller regulates the flow of current in the primary side of the transformer. The waveform generated by the primary controller that turns a switch coupled to the primary of the transformer on or off determines the amount of energy transferred from the input to the output of the power converter. The circuit 100 is also used for AC/DC power converters where an inductor replaces the transformer and the input and output of the converter are not isolated. The circuit 100 can be included in any power converter and by modifying the output waveform of the circuit 100 the output of the converter is controlled. An example of the output waveform is a series of pulses where a frequency and a duty cycle are the parameters to control the flow of energy. As another example is the utilization of a pulse width modulation (PWM) scheme for the output waveform.

The circuit 100 includes an input node 105 to receive an input voltage and an input current and an output node 150 to provide an output waveform. It also includes a fault detection module 140 configured to receive fault detection events as well as a first shut down mode module 115 and a second shut down mode module 120 where the fault detection module is coupled to the second shut down mode module. When the circuit is in shut down mode, one of the first shut down mode module 115 or the second shut down mode module 120 is activated. Activating either of the shut down modes disables the output waveform and reduces the input current of the circuit. The first shut down mode shuts down most of the circuit components and reduces the input current to a first shut down current I1 or an example current of 20 micro amperes. The second shut down mode shuts down a number of the circuit components and reduces the input current to a second shut down current I2 where I2 is larger than I1 and as an example is 200 micro amperes. When a fault event occurs, the module 140 commands the module 120 and activates it, disabling the output waveform and reducing the input current to I2. The circuit also includes a under voltage lock out (UVLO) module 110 coupled to the input node 105 that receives an input voltage and an input current from the input node 105. The UVLO is configured such that when the input voltage gets below a first threshold voltage V1 the module 110 activates the first shut down mode module 115. Entering the first shut down mode causes the fault controller circuit to disable the output waveform and reduce the input current to the I1. The output waveform controls a switch (not shown) coupled to the controller circuit. Disabling the output waveform causes the switching to stop and the switch to stay off (e.g., open).

After activating the first shut down mode or at the initial power up, the output waveform stays disabled until the input voltage at the input node 105 reaches a second threshold value V2 where V2 is greater than V1. At this point the UVLO module 110 informs the first shut down mode module 115 of the voltage change and in response module 115 enables the initial switching module 125 while keeping the normal switching module 130 still disabled. The initial switching module 125 produces a first output waveform that after amplification by the gate driver module 135 is delivered at the GATE node 150. The GATE node is coupled to a switch and the switch initiates switching and current flows through the rest of the circuit further rising the input voltage and current. During initial switching the fault controller drives the initial switching current I3 greater than I2. When the fault controller circuit can be supplied a normal switching current I4 greater than I3, the circuit transitions from the initial twitching mode to the normal switching mode by disabling the initial switching module 125 and enabling the normal switching module 130 and generating a second output waveform that is delivered to the GATE node 150.

The response of the fault controller to a fault event depends on the power converter configuration that utilizes the controller and the input current and voltage the rest of the circuit can provide. When a fault event occurs the fault detection module 140 activates the second shut down mode module and disables the output waveform and stops switching and the controller circuit starts drawing a low input current of I2. The converter's circuitry outside the fault controller being capable of sustaining I2, prevents the input voltage to drop below V1 and the controller indefinitely stays in this second shut down mode and a manual intervention is needed to take it out of this mode. However, if the power convert circuitry cannot sustain I2 and drawing I2 causes the input voltage at node 105 to drop below V1, the fault controller activates the first shut down mode. Transitioning to the first shut down mode further reduces the input current to the first shut down current I1. The power converter circuit is designed to sustain a current more than I1 when the fault controller is in shut down mode and this causes the input voltage to rise. When the input voltage reaches V2 the circuit wakes up again and transitions to the initial switching mode. If the cause of fault is not removed this cycle indefinitely continues but the speed of repetition depends on the power converter's circuitry outside the fault controller circuit and how fast the voltage at node 105 rises. Examples of fault events are an over voltage protection event, an over current protection event, a load current short protection event, a line surge protection event, and an over temperature protection event.

In an example, the fault controller circuit including the initial switching mode and the normal switching mode modules are configured to generate waveforms that are adapted to comply with PFC requirements. The outputs of the modules are configured to be delivered to the driver DR module 135. The output of the driver 135 is coupled to circuit's GATE node 150, which constitutes the output of the controller circuit. The GATE output 150 of the circuit 100 is configured to drive a switch (not shown) of a power converter. The driver 135 amplifies the output signal that drives the switch. In an example, the fault controller circuit 100 is coupled to a PFC circuitry and additionally corrects the power factor for each mode of operation. In another example the combination of the fault controller circuit and the PFC circuitry are included in an integrated circuit chip.

Figure 2:
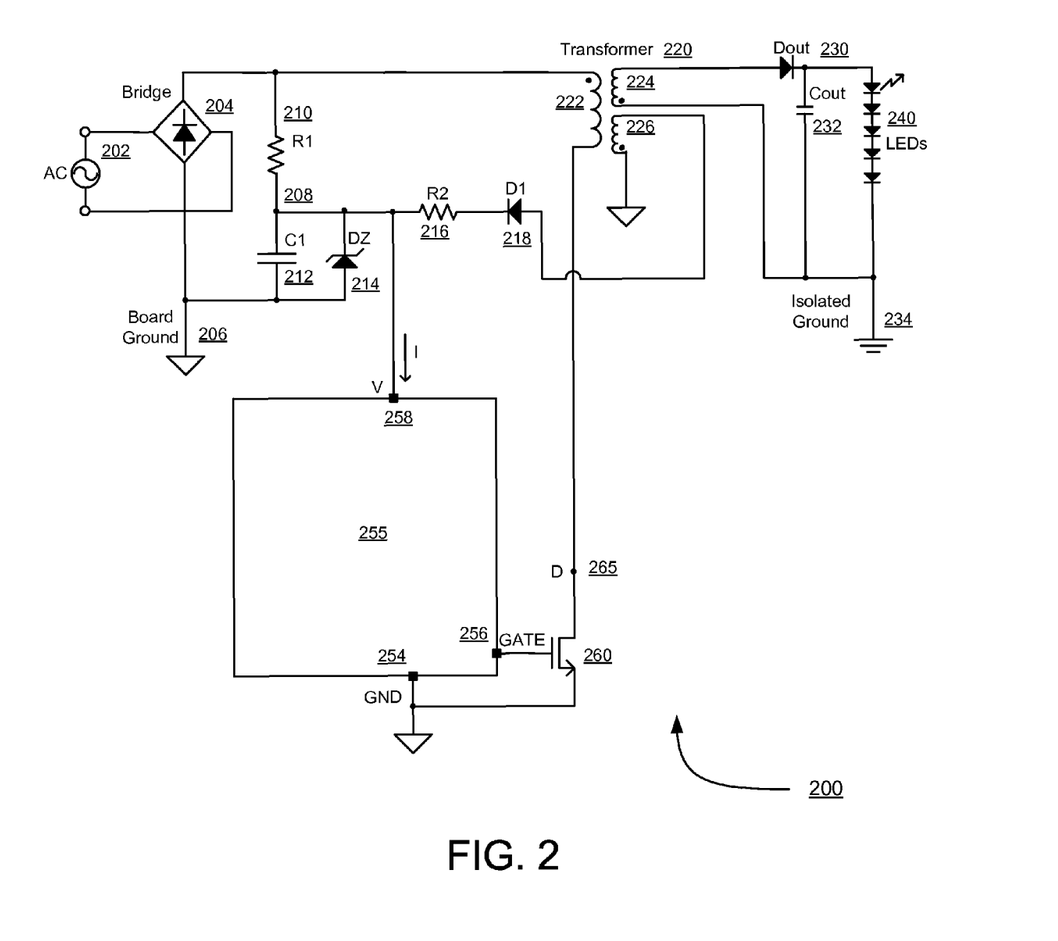
FIG. 2 is a circuit diagram of an example isolated AC/DC power converter with a fault controller circuit and LED string load.

FIG. 2 is an example of an isolated AC/DC power converter circuit 200 that incorporates the fault protection primary controller circuit of FIG. 1 as its module 255. The isolated AC/DC power converter circuit incorporates a transformer 220 that magnetically couples the primary side 222 with the secondary side 224. The primary side 222 is part of the input circuit with an input ground 206 and the secondary side 224 is part of the output circuit with and isolated output ground 234.

The output of circuit 200 includes the secondary winding 224 of the transformer that is inversely coupled to its primary winding and is coupled to the anode of diode 230 from one side and the isolated ground 234 from the other side. A load 240 in parallel with an output capacitor 232 is coupled between the cathode of diode 230 and the ground 234. The example circuit has a string of LEDs as its load.

The input of circuit 200 includes the primary winding 222 of the transformer and is coupled to the ground 206 through a switch 260 from one side and to the rectifying Bridge 204 from the other side where the Bridge 204 is supplied through an alternating current (AC) line 202. At initial power up and before the required voltage is supplied to module 255 through its node 258 to begin producing a waveform at node 256, the input capacitor 212 is charged through resistor 210. When the voltage at node 208 reaches to a value V2 that module 255 starts operating, the switch 260 starts turning on and off and a current start flowing in the output side as well as the auxiliary winding 226. The current produced by the auxiliary winding 226 also charges the input capacitor 212 through the diode 218 and resistor 216 and during normal operation of the power converter this current is the main source to charge capacitor 212 and provides the current at node 258. A Zener diode 214 coupled in parallel with capacitor 212 clamps the voltage at node 258. The secondary and auxiliary windings 224 and 226 are inversely coupled to the primary winding 222 and because of the orientation of the diodes 230 and 216, the current through both windings 224 and 226 flow when the switch 260 turns off.

The module 255 incorporated in circuit 200 is an example of a fault protection controller circuit displayed in FIG. 1 where its node 254 is coupled to primary side ground 206. The input voltage and current of the module 255 is supplied through capacitor 212 coupled to the module's input node 258. There are two paths for charging capacitor 212. The first path is using the rectifier and through resistor 210. As long as the alternative current (AC) source is connected the capacitor 212 is charges through the first path. The second path is through the auxiliary winding 226 of the transformer. The capacitor 212 is also charged through the auxiliary winding when the switching occurs in the initial switching mode or normal switching mode but not in any shut down mode. The module 255 is configured to receive its input current and voltage from node 258 and to supply an output waveform at node 256 to make the switch on or off. When the fault controller activates either of the first or second shut down modes the output waveform is disabled and the switch 260 stays off (open) and as a result no current flows through the primary 222, secondary 224, or auxiliary 226 windings. In other situations an output waveform adapted for initial switching or normal switching is delivered at the GATE node 256 where it turns the switch 260 on or off.

The example circuit 200 is an isolated AC/DC power converter. If an inductor replaces the transformer of the isolated AC/DC power converter, the input and the output of the converter do not stay isolated anymore and share the same ground and the same module 255 can be used for the output control of the new circuit. There are other methods and routes for supplying the input voltage and current to module 255. It is important that a first group of one or more routes supply the current and do not depend on the switch and a second group of one or more of the routes only supply the input current to module 255 when the switch is turning on or off. The total current supplied by the first group or routes determines whether after a fault event the fault controller stays in the second shut down mode or transitions to the first shut down mode. A modification of the circuitry outside module 255 can change the current supplied by the first group of routes and modify the response of the fault controller to a fault event. The current supplied by the second group of routes provides the required current in the initial and normal switching modes. As an example, in circuit 200 the first group of routes or paths consists of only one route, the rectifier that charges the capacitor 212 through resistor 210. The second group of paths or routes in circuit 200 consists of only one route as well, the auxiliary winding 226 that charges the capacitor 212 through diode 218 and resistor 216. Modifying the resistor 210 of circuit 200 changes the response of the fault controller to a fault event.

Figure 3:
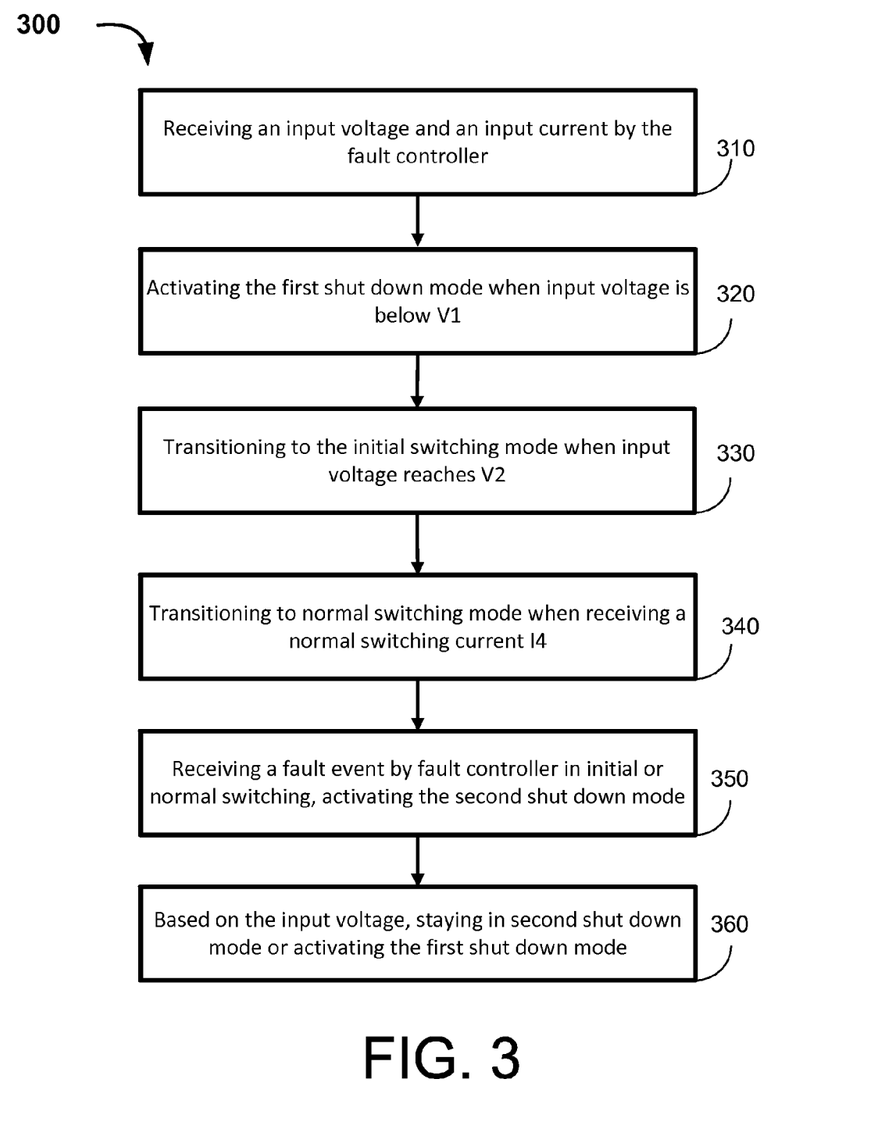
FIG. 3 is a flow diagram of an example method for driving the controller of the example circuit of FIG. 1.

FIG. 3 is a flow diagram of process 300 implemented on the circuit 100 of FIG. 1 for fault protection and control of a power converter. The fault controller circuit receives an input voltage and current in step 310 and activates the first shut down mode in step 320 when the input voltage drops below a first threshold voltage V1. When the input voltage increases to the second threshold voltage V2 the controller wakes up and transitions to the initial switching mode in step 330. When the normal switching input current I4 can be provided to the fault controller it activates the normal switching mode in step 340. In step 350, if a fault event is received by the controller circuit while in initial or normal switching modes, the fault controller automatically activates the second shut down mode.

Depending on the input voltage and in step 360, the fault controller stays in the second shut down mode or activates the first shut down mode and restarts the fault controller.

Figure 4:
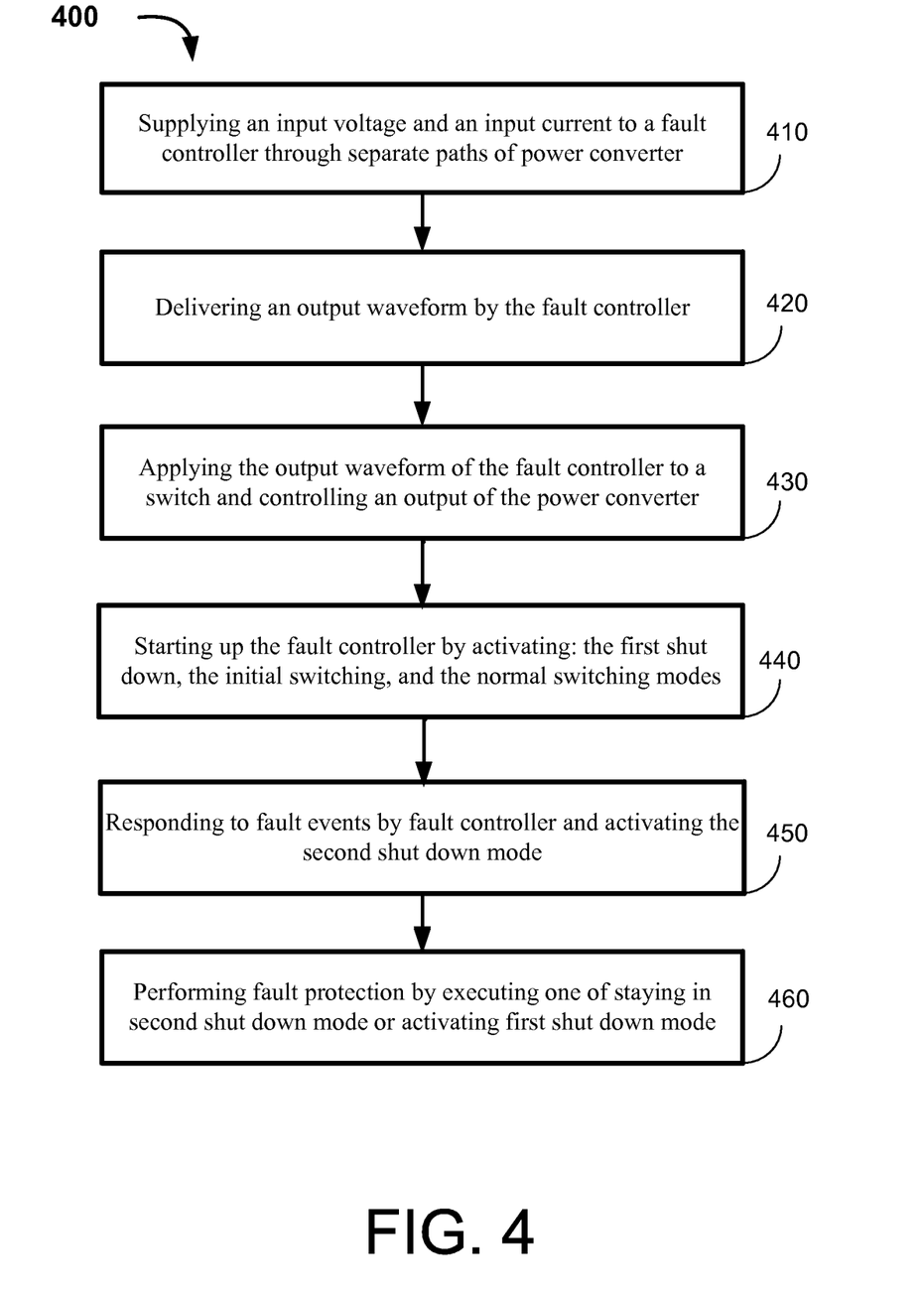
FIG. 4 is a flow diagram of an example method for controlling an AC/DC power converter with the fault controller circuit of FIG. 2.

FIG. 4 is a flow diagram of a process 400 for controlling a power converter utilizing a fault protection and controller circuit and implemented on an example circuit 200 described in reference to FIG. 2. In step 410 the input current and voltage is supplied to a fault controller where the input current and voltage is supplied through separate paths. In step 420 an output waveform is delivered by the fault controller and in step 430 the output waveform is applied to a switch that controls the output of the power converter. In step 440 the fault controller starts up by activating the first shut down, the initial switching, and the normal switching modes in sequence. In step 450 a fault event occurs and the controller enters the second shut down mode. Based on the supplied current and voltage to the input of the fault controller, it stays in the second shut down mode or restarts the fault controller in step 460.

Figure 5:
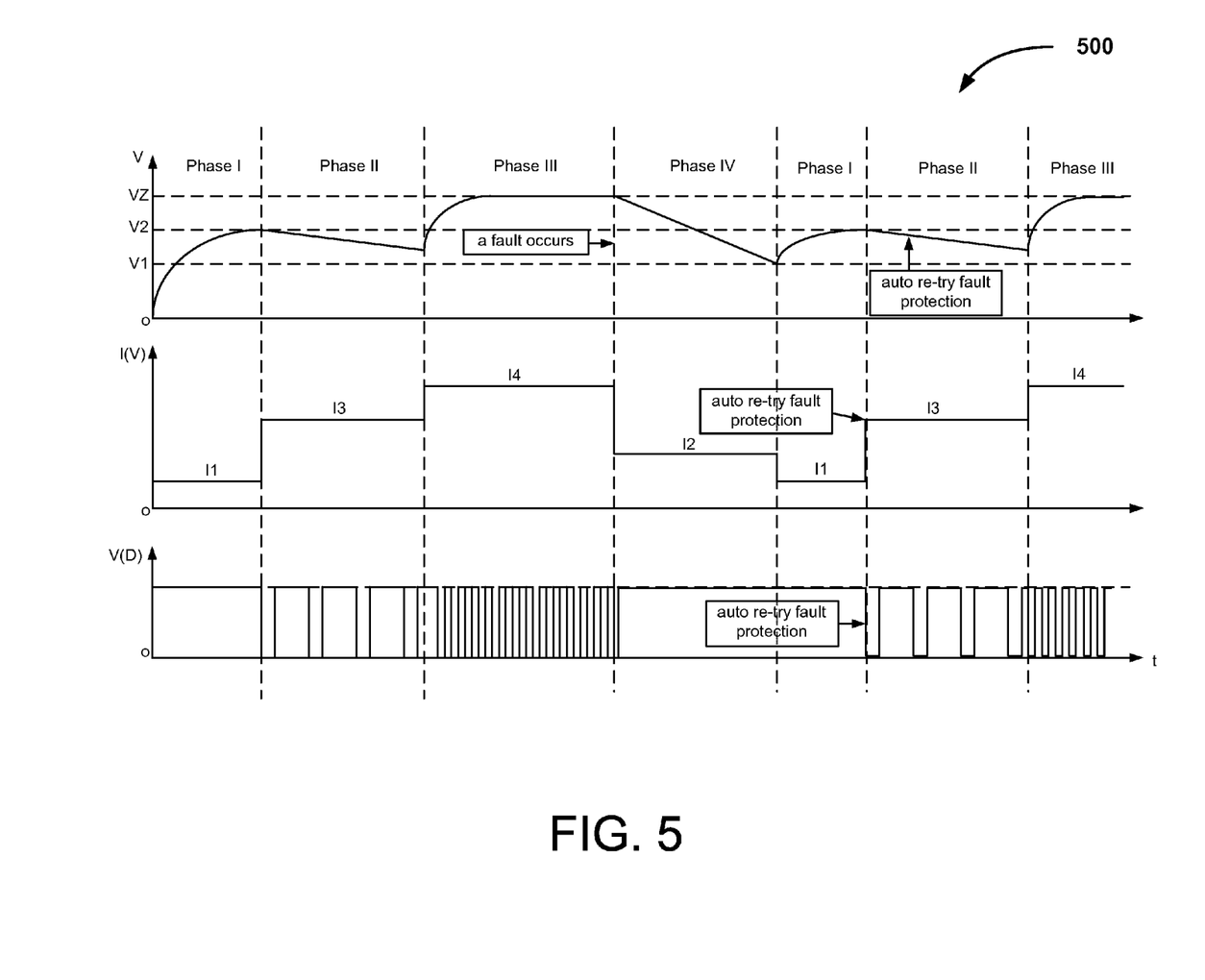
FIG. 5 is a timing diagram of example current and voltages for auto retry fault protection.

In FIG. 5 an example timing diagram 500 of auto retry fault protection for the fault controller of FIG. 2 is shown. The voltage V(D) is the voltage of the point 265, the current I(V) is the current entering node 258 and V is the voltage of node 258 all displayed in FIG. 2. In phase I of FIG. 5, the controller is in the first shut down mode and the controller input drives the smallest current I1. This causes the resistor-capacitor circuit coupled to rectifier to charge the capacitor and increase the input voltage. In phase II the input voltage reaches the second threshold voltage V2 and the controller starts waking up (initial switching) and drawing a current I3. Note that passing the first threshold voltage V1 had no effect and also that the increase in the input current from I1 to I3 is due to the current provided to the output of the controller as show by the voltage V(D) displaying that the transistor switch is turning on and off. In this phase the input voltage should stay between the thresholds V1 and V2. In phase III (normal switching) as shown by the V(D) the switching increases and current through the auxiliary winding charges the capacitor to the level that the input voltage is clamped by the Zener diode voltage VZ. At the end of phase III a fault occurs and the controller enters the second shut down mode and requires a current I2 more than I1. As shown in phase IV the circuit is not able to sustain I2 and the input voltage drops until it falls below the first threshold voltage V1 and the controller enters the first shut down mode again. Entering the first shut down mode causes the above cycle to repeat.

Figure 6:
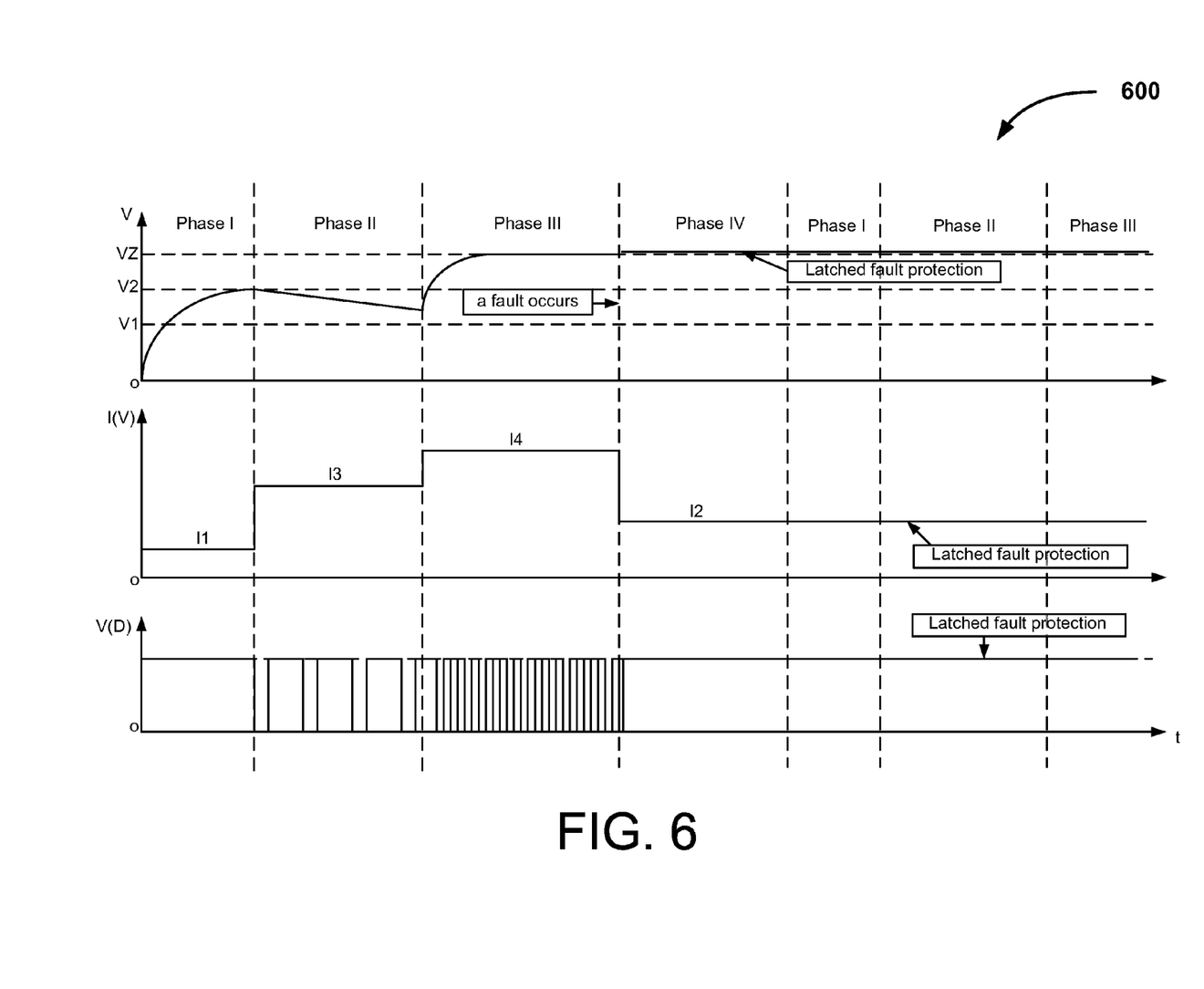
FIG. 6 is a timing diagram of example current and voltages for latched fault protection.

In FIG. 6 an example timing diagram 600 of latched fault protection for the fault controller of FIG. 2 is shown. As described, the voltage V(D) is the voltage of the point 265, the current I(V) is the current entering node 258 and V is the voltage of node 258 all in FIG. 2. Phase I to phase III of FIG. 6 is the same as the same phases in FIG. 5. However, after the fault happens at the end of phase III in FIG. 6 the circuit can sustain the current I2 and nothing further changes with the input voltage being latched to the Zener voltage and the switching stopped as the controller continue to stay in the second shut down mode. The example currents I1, I2, I3, and I4 graphed in FIG. 5 and FIG. 6 are not current variations as a function of time. The displayed values show an average or a level of current in each phase and indicate that values are distinct from each other.

What is claimed is:

1. A fault controller circuit comprising:
   an output node configured to deliver an output waveform for driving a switch;
   an input node configured to receive an input voltage and an input current;
   an under voltage lock out (UVLO) module coupled to the input node;
   an initial switching (IS) mode module configured to activate an initial switching mode and generate a first output waveform;
   a normal switching (NS) mode module coupled to the IS mode module and configured to activate a normal switching mode and generate a second output waveform;
   a first shut down (FSD) mode module coupled to the UVLO and the IS mode and the NS mode modules and configured to activate a first shut down mode, wherein the FSD mode module is enabled when the UVLO module receives a voltage below a first threshold voltage (V1) from the input node, the FSD mode including: disabling the IS and NS mode modules, disabling the output waveform of the circuit and driving a FSD mode current (I1) from the input node of the circuit;
   a second shut down (SSD) mode module coupled to the IS mode and the NS mode modules and configured to activate a second shut down mode;
   a fault detection module coupled to the SSD mode module and configured to receive fault events; and
   a gate driver (DR) module coupled to the output node and the IS and the NS mode modules and configured to receive the first output waveform or the second output waveform and to deliver the received output waveform at the output node,
   wherein the circuit transitions from the IS mode or the NS mode to the SSD mode and enables the SSD mode module when a fault event by the fault detection module is received, the second shut down mode including: disabling the IS and NS mode modules, disabling the output waveform of the circuit and driving a second shut down mode current (I2) from the input node of the circuit, wherein I2 is greater than I1.

2. The circuit of claim 1, wherein the circuit transitions from the FSD mode to the IS mode and enables the IS mode module when the received voltage by the UVLO module reaches a second voltage threshold (V2) greater than V1, the IS mode comprising:
   generating the first output waveform,
   providing the first output waveform at the output node,
   driving an IS current (I3) from the input node of the circuit.

3. The circuit of claim 2, wherein the circuit transitions from the IS mode to the NS mode and enables the NS mode module when the input node becomes adapted to receive a NS current (I4) greater than I3 as the input current of the circuit, and wherein the NS mode includes:
   generating the second output waveform, and
   providing the second output waveform at the output node.

4. The circuit of claim 1, wherein based on the input voltage, performing one of:
   remaining in the SSD mode when the input voltage is greater than V1, and
   activating the FSD mode when the input voltage drops below V1.

5. The circuit of claim 1, wherein the fault event is one or more of the events:
   an over voltage protection event,
   an over current protection event,
   a load current short protection event,
   a line surge protection event, and
   an over temperature protection event.

6. The circuit of claim 1, wherein the output node is coupled to the switch and drives the switch.

7. The circuit of claim 1, wherein the first output waveform and the second output waveform are a series of pulses.

8. The circuit of claim 1, wherein the circuit is a part of an integrated circuit incorporated in a chip.

9. The circuit of claim 8, wherein the circuit is added to a chip including power factor correction circuitry.

10. An isolated AC/DC power converter with fault control, the power converter comprising:
 a rectifier configured to rectify an alternating input voltage;
 a transformer including:
  a primary winding coupled to the rectifier,
  a secondary winding coupled to an output load;
 a fault controller having an output (GATE) node and an input (V) node and configured for:
  receiving an input voltage and input current at the V node,
  providing an output waveform at the GATE node,
  activating a first shut down mode and disabling the output waveform and driving a first shut down current (I1) from the V node when the input voltage is smaller than a first threshold voltage (V1),
  transitioning from the first shut down mode to an initial switching mode and providing a first output waveform at the GATE node and driving an initial switching current (I3) from the V node when the input voltage reaches a second threshold voltage (V2) greater than V1,
  transitioning from the initial switching mode to a normal switching mode and providing a second output waveform at the GATE node when the V node of the fault controller becomes adapted to receive a normal switching current (I4) greater than I3,
  transitioning from the initial switching mode or the normal switching mode to a second shut down mode and disabling the output waveform when receiving a fault event, wherein the second shut down mode drives a second shut down current (I2), and wherein I2 is greater than I1;
 a switch coupled to the GATE node of the fault controller and the primary winding of the transformer and a ground, the switch configured to receive the output waveform of the fault controller and to control the flow of a current in the primary of the transformer.

11. The power converter of claim 10, wherein the switch is a transistor.

12. The power converter of claim 10, wherein the rectifier is a diode bridge.

13. The power converter of claim 10, wherein the primary winding and the secondary winding of the transformer are isolated.

14. The power converter of claim 10, further comprising circuitry to provide the input voltage and input current of the fault controller by charging a first capacitor (C1) coupled to the V node of the fault controller, the circuitry including:
 a first charging path through a first resistor (R1) coupled in series with C1 and coupled to the rectifier; and
 a second charging path configured to charge C1 in the initial switching and normal switching modes, the second charging path including an auxiliary secondary winding of the transformer, wherein the auxiliary secondary winding is coupled through a portion of the circuitry including a diode and the capacitor C1.

15. The power converter of claim 14, wherein in the second shut down mode, charging C1 through the first charging path provides the second shut down current I2 of the fault controller, the input voltage remains greater than V1 and the power converter stays in the second shut down mode.

16. The power converter of claim 14, wherein in the second shut down mode, charging C1 through the first charging path provides a current less than the second shut down current I2 of the fault controller, the input voltage drops below V1 and the power converter transitions to the first shut down mode.

17. The power converter of claim 14, wherein in the first shut down mode, charging C1 through the first charging path provides a current greater than I1, wherein the input voltage of the fault controller rises to V2, and wherein the power converter the transitions to the initial switching mode.

18. A method of providing a waveform as an output of a fault controller circuit configured for driving a switch, the method comprising:
 receiving an input voltage and an input current from an input node;
 activating a first shut down mode when the input voltage is below a first threshold (V1), the shut down mode including:
  driving a first shut down current (I1) as the input current,
  disabling the output waveform and stop switching;
 transitioning from the first shut down mode to an initial switching mode when the input voltage reaches a second threshold (V2), the initial switching mode including:
  providing a first output waveform at the output of the controller,
  driving an initial switching current (I3) as the input current;
 transitioning from the initial switching mode to a normal switching mode when the input node of the fault controller becomes adapted to receive a normal switching current (I4) greater than I3 as the input current, the normal switching mode including:
  providing a second output waveform at the output of the controller;
 transitioning from the initial switching mode or the normal switching mode to a second shut down mode when receiving a fault event, the second shut down mode including:
  driving a second shut down current (I2) as the input current, wherein I2 is greater than I1,
  disabling the output waveform and stop switching;
 based on the input voltage performing one of:
  remaining in the second shut down mode when the input voltage is greater than V1,
  activating the first shut down mode when the input voltage drops below V1.

19. The method of claim 18, wherein the output of the controller is coupled to a switch and drives the switch.

20. The method of claim 18, wherein the first output waveform and the second output waveform are series of pulses.

21. The method of claim 18, wherein the fault event is one or more of the events:
 an over voltage protection event,
 an over current protection event,
 a load current short protection event,
 a line surge protection event, and
 an over temperature protection event.

* * * * *